(No Model.)

J. WELCH.
DRYING ATTACHMENT FOR CORN CRIBS.

No. 504,258. Patented Aug. 29, 1893.

WITNESSES
Geo. E. Frech.
Rol. A. Fitzgerald.

INVENTOR
Joseph Welch,
By Lehmann Pattison & Nesbit
attys.

UNITED STATES PATENT OFFICE.

JOSEPH WELCH, OF DELPHOS, OHIO.

DRYING ATTACHMENT FOR CORN-CRIBS.

SPECIFICATION forming part of Letters Patent No. 504,258, dated August 29, 1893.

Application filed September 8, 1892. Serial No. 445,378. (No model.)

*To all whom it may concern:*

Be it known that I, JOSEPH WELCH, of Delphos, in the county of Allen and State of Ohio, have invented certain new and useful Improvements in Drying Attachments for Corn-Cribs; and I do hereby declare the following to be a full, clear, and exact description of the invention, such as will enable others skilled in the art to which it pertains to make and use it, reference being had to the accompanying drawings, which form part of this specification.

My invention relates to an improvement in drying attachments for corn cribs; and it consists in the novel features of construction which will be fully described hereinafter, and especially referred to in the claims.

The object of my invention is to provide an improved device whereby a thorough ventilation of the corn is secured while the same is packed in the crib, thus drying the same very rapidly and preventing it from heating.

Figure 1:
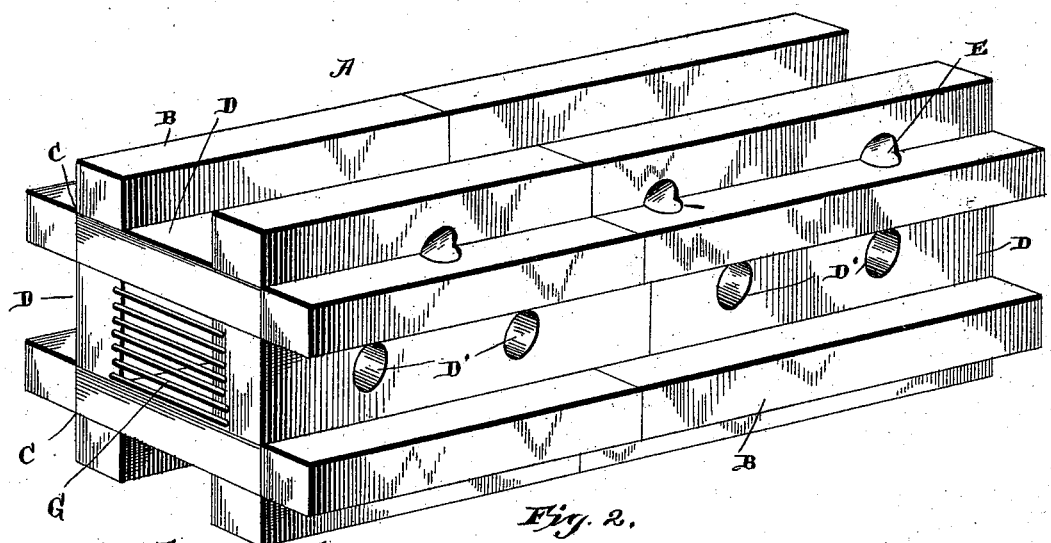
Figure 2:
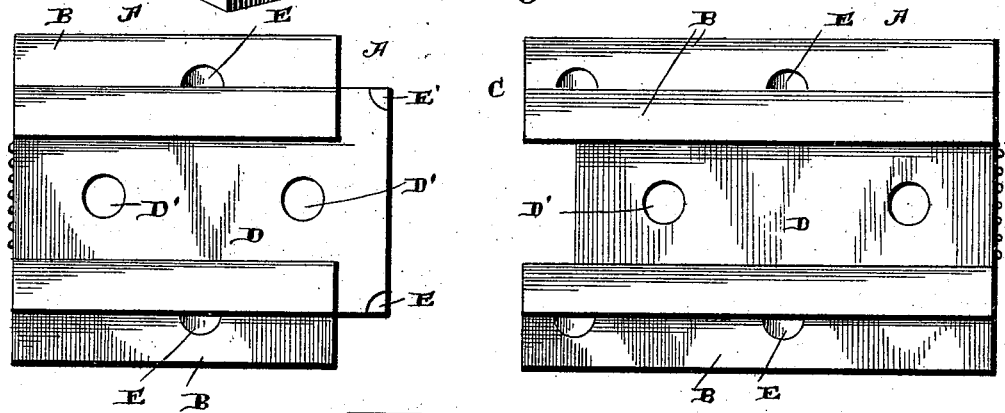
Figure 3:
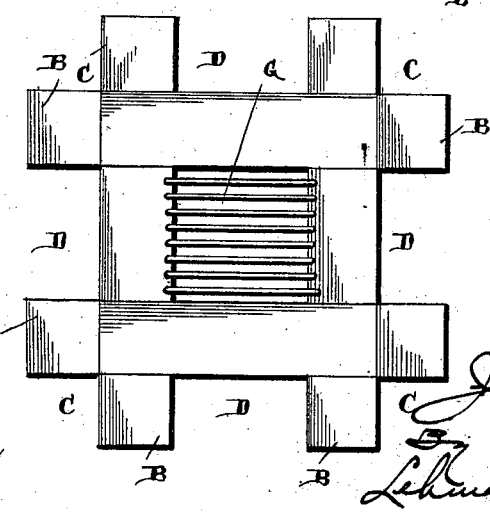

Referring to the accompanying drawings, Figure 1 is a perspective view of my improved attachment. Fig. 2 is a side elevation, showing two sections detached. Fig. 3 is an end view.

A, represents an angular trough having four sides which form a longitudinal passage or inclosure.

Secured to the outer sides of the trough adjacent the longitudinal edges are strips B, which extend the length of the trough, thus forming angular spaces C, on the corners of the device and spaces D the whole length of each side. The respective sides of the box are provided with perforations D, while the corner spaces C, communicate with the interior of the trough by means of the openings E. Thus it will be seen that free ingress and egress of air is afforded the spaces D and C.

The device as above described is adapted to be placed in position within the corncrib, either longitudinally with the same or across it, and any number may be employed that may be thought most desirable. Having thus been put in place the corn is thrown into the crib and as it fills up the drying attachment becomes covered. The strips B, however prevent the corn from packing close to the trough A, and thus the passages C, and D, are kept clear. As the ends of the trough A, are extended to the ends or sides of the crib a free passage of air is maintained through it and from it out through the openings D', and E, to the spaces C, and D from which it circulates through the corn ears thus drying them very quickly.

This ventilating trough may be made in one continuous section as shown in Fig. 1, or it may be divided at intervals as shown in Fig. 2 in which case the ends of the strips B, of one portion overlap the trough end of the adjacent portion so that they are securely fastened together. The ends of the trough are protected by bars G so that vermin are most effectually excluded therefrom.

Having thus particularly described my invention, what I claim as new, and desire to secure by Letters Patent of the United States, is—

1. A ventilator for corn cribs comprising a closed angular trough provided with longitudinal strips upon the outer sides of its walls to support the corn from contact therewith, the said walls of the trough having transverse openings which have their opposite ends respectively communicating with the interior of the trough and with the spaces between the said longitudinal strips, substantially as shown and described.

2. A corn ventilator consisting of a closed rectangular trough provided with longitudinal strips on its outer sides opposite the edges of the walls of said trough, whereby the outer sides of said strips substantially intersect at their inner edges to support the corn from the sides of the wall, the walls of said trough having transverse openings communicating with the interior of the trough and with the space between the inner sides of said strips, and the corners of said walls and the meeting edges of said strips having diagonal perforations communicating with the interior of the trough and with the space between the outer sides of the said strips, substantially as shown and described.

In testimony whereof I affix my signature in presence of two witnesses.

JOSEPH WELCH.

Witnesses:
ALEX. SHENK,
J. H. WAHMHOFF.